(12) United States Patent
Gardell et al.

(10) Patent No.: US 7,693,137 B2
(45) Date of Patent: *Apr. 6, 2010

(54) MULTI-LINE APPEARANCE TELEPHONY VIA A COMPUTER NETWORK

(75) Inventors: Steven E. Gardell, North Andover, MA (US); Israel B. Zibman, Newton, MA (US); Gregory C. Depp, Needham, MA (US)

(73) Assignees: Verizon Corporate Sevices Group Inc., Basking Ridge, NJ (US); Level 3 Communications, LLC, Basking Ridge, NJ (US)

( * ) Notice: Subject to any disclaimer, the term of this patent is extended or adjusted under 35 U.S.C. 154(b) by 407 days.

This patent is subject to a terminal disclaimer.

(21) Appl. No.: 11/446,212

(22) Filed: Jun. 5, 2006

(65) Prior Publication Data

US 2006/0250990 A1 Nov. 9, 2006

Related U.S. Application Data

(63) Continuation of application No. 09/177,700, filed on Oct. 23, 1998, now Pat. No. 7,116,656.

(51) Int. Cl.
*H04L 12/66* (2006.01)

(52) U.S. Cl. ............ 370/352; 379/142.01; 379/142.04; 379/142.06; 370/356; 370/401; 370/389

(58) Field of Classification Search ................ 370/352, 370/356, 401, 465; 439/676; 379/88.19, 379/88.21, 142.04, 142.06, 265
See application file for complete search history.

(56) References Cited

U.S. PATENT DOCUMENTS 4,360,910 A 11/1982 Segal et al.
4,694,483 A * 9/1987 Cheung ................. 379/265.06
4,885,739 A 12/1989 Read et al.
5,023,868 A 6/1991 Davidson
5,042,027 A 8/1991 Takase et al.
5,140,626 A 8/1992 Ory et al.
5,247,347 A 9/1993 Litteral et al.
5,255,314 A 10/1993 Applegate et al.
5,265,155 A 11/1993 Castro
5,291,302 A 3/1994 Gordon et al.
5,457,735 A 10/1995 Erickson (Continued)

FOREIGN PATENT DOCUMENTS

EP 0789470 A2 9/2002

(Continued)

OTHER PUBLICATIONS

ITU—T Recommendations H.323 (Packet-based multimedia communications systems), Title Date: Feb. 1998.*

(Continued)

*Primary Examiner*—Harry S Hong
*Assistant Examiner*—Antim Shah

(57) ABSTRACT

A method and apparatus are provided for creating traditional multi-line appearance telecommunications capabilities in a computer network for communications received from a switched circuit network. The system and method create key system and attendant/attendee relationships between the respective terminal end-points of the computer network. In addition, multiple line appearances may be supported simultaneously at a single terminal end-point.

16 Claims, 6 Drawing Sheets

U.S. PATENT DOCUMENTS

| | | | |
|---|---|---|---|
| 5,471,519 A | 11/1995 | Howe et al. | |
| 5,481,603 A | 1/1996 | Gutierrez et al. | |
| 5,491,743 A | 2/1996 | Shiio et al. | |
| 5,541,917 A | 7/1996 | Farris | |
| 5,546,447 A | 8/1996 | Skarbo et al. | |
| 5,566,236 A | 10/1996 | MeLampy et al. | |
| 5,572,728 A | 11/1996 | Tada et al. | |
| 5,583,564 A | 12/1996 | Rao | |
| 5,583,920 A | 12/1996 | Wheeler, Jr. | |
| 5,590,171 A | 12/1996 | Howe et al. | |
| 5,592,477 A | 1/1997 | Farris et al. | |
| 5,594,789 A | 1/1997 | Seazholtz et al. | |
| 5,600,704 A | 2/1997 | Ahlberg et al. | |
| 5,619,555 A | 4/1997 | Fenton et al. | |
| 5,651,054 A | 7/1997 | Dunn et al. | |
| 5,657,096 A | 8/1997 | Lukacs | |
| 5,712,906 A | 1/1998 | Grady et al. | |
| 5,726,984 A | 3/1998 | Kubler et al. | |
| 5,742,596 A | 4/1998 | Baratz et al. | |
| 5,742,905 A | 4/1998 | Pepe et al. | |
| 5,758,079 A | 5/1998 | Ludwig et al. | |
| 5,764,901 A | 6/1998 | Skarbo et al. | |
| 5,768,344 A | 6/1998 | Kruger et al. | |
| 5,768,346 A | 6/1998 | Spruijt | |
| 5,768,356 A | 6/1998 | McKendry et al. | |
| 5,790,173 A | 8/1998 | Strauss et al. | |
| 5,790,548 A | 8/1998 | Sistanizadeh et al. | |
| 5,815,562 A * | 9/1998 | Iglehart et al. | 379/211.04 |
| 5,828,838 A | 10/1998 | Downs et al. | |
| 5,862,208 A | 1/1999 | MeLampy et al. | |
| 5,862,329 A | 1/1999 | Aras et al. | |
| 5,867,494 A | 2/1999 | Krishnaswamy et al. | |
| 5,867,566 A | 2/1999 | Hogan | |
| 5,867,653 A | 2/1999 | Aras et al. | |
| 5,889,945 A | 3/1999 | Porter et al. | |
| 5,890,062 A | 3/1999 | Courtney et al. | |
| 5,896,128 A | 4/1999 | Boyer | |
| 5,907,324 A | 5/1999 | Larson et al. | |
| 5,909,431 A | 6/1999 | Kuthyar et al. | |
| 5,930,700 A | 7/1999 | Pepper et al. | |
| 5,940,479 A | 8/1999 | Guy et al. | |
| 5,940,484 A * | 8/1999 | DeFazio et al. | 379/142.06 |
| 5,943,335 A * | 8/1999 | Dilley et al. | 370/360 |
| 5,949,869 A | 9/1999 | Sink | |
| 5,991,277 A | 11/1999 | Maeng et al. | |
| 5,991,301 A | 11/1999 | Christie | |
| 5,999,525 A | 12/1999 | Krishnaswamy | |
| 6,006,253 A | 12/1999 | Kumar et al. | |
| 6,018,360 A | 1/2000 | Stewart et al. | |
| 6,031,896 A * | 2/2000 | Gardell et al. | 379/88.17 |
| 6,049,531 A | 4/2000 | Roy | |
| 6,058,172 A * | 5/2000 | Lim et al. | 379/142.13 |
| 6,058,178 A | 5/2000 | McKendry et al. | |
| 6,069,890 A | 5/2000 | White et al. | |
| 6,101,182 A | 8/2000 | Sistanizadeh et al. | |
| 6,104,711 A | 8/2000 | Voit | |
| 6,108,704 A | 8/2000 | Hutton | |
| 6,122,357 A | 9/2000 | Farris et al. | |
| 6,122,363 A | 9/2000 | Friedlander et al. | |
| 6,124,880 A | 9/2000 | Shafiee | |
| 6,125,126 A | 9/2000 | Hallenstal | |
| 6,128,304 A * | 10/2000 | Gardell et al. | 370/401 |
| 6,141,339 A | 10/2000 | Kaplan et al. | |
| 6,157,823 A | 12/2000 | Fougnies | |
| 6,173,044 B1 | 1/2001 | Hortensius et al. | |
| 6,185,288 B1 | 2/2001 | Wong | |
| 6,192,116 B1 | 2/2001 | Mayak | |
| 6,196,846 B1 | 3/2001 | Berger et al. | |
| 6,226,367 B1 | 5/2001 | Smith et al. | |
| 6,259,691 B1 * | 7/2001 | Naudus | 370/352 |
| 6,288,740 B1 | 9/2001 | Lai et al. | |
| 6,298,045 B1 | 10/2001 | Pang et al. | |
| 6,298,062 B1 * | 10/2001 | Gardell et al. | 370/401 |
| 6,343,115 B1 | 1/2002 | Foladare et al. | |
| 6,347,085 B2 | 2/2002 | Kelly | |
| 6,359,880 B1 | 3/2002 | Curry | |
| 6,374,302 B1 | 4/2002 | Galasso et al. | |
| 6,393,275 B1 * | 5/2002 | Alfred | 455/422.1 |
| 6,449,260 B1 * | 9/2002 | Sassin et al. | 370/270 |
| 6,457,043 B1 * | 9/2002 | Kwak et al. | 709/204 |
| 6,487,196 B1 | 11/2002 | Verthein et al. | |
| 6,574,681 B1 | 6/2003 | White | |
| 6,594,254 B1 | 7/2003 | Kelly | |
| 6,707,797 B1 * | 3/2004 | Gardell et al. | 370/260 |
| 6,839,340 B1 | 1/2005 | Voit et al. | |
| 7,116,656 B1 * | 10/2006 | Gardell et al. | 370/352 |
| 2001/0043577 A1 * | 11/2001 | Barany et al. | 370/328 |
| 2001/0043608 A1 * | 11/2001 | Potter et al. | 370/401 |
| 2002/0064149 A1 | 5/2002 | Elliott | |
| 2003/0193933 A1 | 10/2003 | Jones | |
| 2005/0032435 A1 * | 2/2005 | Tischer et al. | 439/676 |

FOREIGN PATENT DOCUMENTS

| | | |
|---|---|---|
| EP | 0789470 A3 | 9/2002 |
| JP | 61-242446 | 10/1986 |
| JP | 63-260347 | 10/1988 |
| JP | 09-83651 | 3/1997 |
| JP | 11-215184 | 8/1999 |
| JP | 2002-519891 | 7/2002 |
| WO | WO97/16007 | 5/1997 |
| WO | WO 97/20424 | 6/1997 |
| WO | WO98/17048 | 4/1998 |
| WO | W098/36543 | 8/1998 |
| WO | WO99/67922 | 12/1999 |

OTHER PUBLICATIONS

Labriola, Don, "Here's Looking at You," Computer Shopper, Sep. 1997, p. 335-362.

Kahane, Opher et al., Call Management Agent System: Requirements, Function, Architecture and Protocol, IMTC VoIP Forum Contribution, Jan. 15, 1997, 44 pages.

Heijenk et al, "Communication Systems Supporting Multimedia Multi-user Application", IEEE, 1994.

Kobayashi et. al., "Virtual Conference Room: A Metaphor for Multi—User Real Time Conferencing Systems," IEEE International Workshop on Robot and Human Communication, 1993.

Watabe et. al., "Distributed Desktop Conferencing System with Multiuser Multimedia Interface," IEEE Journal on Selected Areas in Communications, vol. 9, No. 4, May 1991.

Thom, "H. 323: The Multimedia Communications Standard for Local Area Network", IEEE, pp. 52-56, Dec. 1996.

U.S. Appl. No. 60/023,891, filed Aug. 16, 1996.

"VocalTec's Telephony Gateway—The Ultimate Internet Telephony Solution?," Computer Telephony Magazine, Sep. 1996.

Kahane at al,, "VocalTec IP Forum Contribution", VocalTec Inc., Seattle, WA, Jan. 15, 1997.

"A Call to Phones," Wired Magazine, Issue 4.03, http://www.wired.com/wired/archive/4.03/updata.html (Mar. 1996).

Mascoli, Cicchetti & Listanti, "Alternative Scenarios for Data Applications Via Internet-Mobile and DECT-ATM Interworkin," 4th IEEE International Conference on Universal Personal Communications, pp. 788-792, Nov. 6-10, 1995 published Apr. 1995.

Blackwell et al. "Secure Short-Cut Routing for Mobile IP," USENIX Summary 1994 Technical Conferences, Jun. 6-10, 1994.

Okada et al. "Mobile Communication Using PHS [Personal Handy Phone System] Communications Server," National Technical Report, vol. 42, No. 1, pp. 46-54 (Feb. 1996).

Yang, C. (Feb. 12, 1995), "INETPhone: Telephone Services and Serves on Internet", RFC 1789 http://ds.internic.net/rfc/rfc/rfc1789.txt.

Sattler, Michael, "Nautilus Voice Encryption" May 10, 1995.

Chernov, Andrey A. "SpeakFreely" software, Apr. 18, 1996.

"Netspeak Corporation Introduces Webphone, Industry's First Internet-Based Telephony Solution for Business Users," PC Forum, Mar. 18, 1996.

"Free World Dialup Beta 2.0a Client," Feb. 12, 1996.

C. Low et al., WebIN-an architecture for fast deployment of IN-based personal services, Intelligent Network Workshop, 1996, IN '96, IEEE, (Apr. 21-24, 1996), vol. 2; 196+258.

Handley et al., "SIP: Session Initiation Protocol", Internet Engineering Task Force, Internet Draft, Jul. 31, 1997, draft-ietf-mmusic-sip-03.txt. Jul. 31, 1997.

"Internet Telephony for Dummies" $2^{nd}$ Edition, Chapters 14-16, 1997.

Kahane et al., "Call Management Agent System Specification" VoIP Forum Technical Committee, Aug. 14, 1996.

IMTC Voice over IP Forum Service Interoperability Implementation Agreement, Draft 0.91, Document VoIP-008, Jan. 13, 1997.

Sebestyn, I., ITU Telecommunication Standardization Sector, Study Group 15, Q:2&3/15 Rapporteur Meeting, Document AVC-1086, v1, Dec. 5, 1996.

Oppen et al., "The Clearinghouse: A Decentralized Agent for Locating Named Objects in a Distributed Environment", ACM Transactions on Office Information Systems, vol. 1, No. 3., Jul. 1983, pp. 230-253.

Noerpel et al., "PACS: Personal Access Communications System—A Tutorial," IEEE Personal Communications, Jun. 1996.

Varma et al., "Architecture for Interworking Data over PCS," IEEE Communications Magazine, Sep. 1996, 124-130.

Rosenberg et al., "SIP for Presence," 41st IETF, Apr. 3, 1998.

* cited by examiner

MULTI-LINE APPEARANCE TELEPHONY VIA A COMPUTER NETWORK

CROSS-REFERENCE TO RELATED APPLICATIONS

This is a continuation of prior U.S. patent application Ser. No. 09/177,700, filed Oct. 23, 1998 now U.S. Pat. No. 7,116,656, titled "MULTI-LINE APPEARANCE TELEPHONY VIA A COMPUTER NETWORK," which is related to the following applications, all of which were filed concurrently therewith and assigned to the assignee of the rights in the present application: Provisional Application Ser. No. 60/105,326 of Gardell et al. entitled "A HIGH SPEED COMMUNICATIONS SYSTEM OPERATING OVER A COMPUTER NETWORK"; Ser. No. 09/177,712 of Gardell et al. entitled "MULTI-LINE TELEPHONY VIA NETWORK GATEWAYS", now U.S. Pat. No. 6,707,797; Ser. No. 09/178,130 of Gardell et al. entitled "NETWORK PRESENCE FOR A COMMUNICATIONS SYSTEM OPERATING OVER A COMPUTER NETWORK", now U.S. Pat. No. 6,128,304; Ser. No. 09/178,271 of Gardell et al. entitled "SPEAKER IDENTIFIER FOR MULTI-PARTY CONFERENCE", now U.S. Pat. No. 6,457,043; Ser. No. 09/178,178 of Gardell et al. entitled "SYSTEM PROVIDING INTEGRATED SERVICES OVER A COMPUTER NETWORK", now U.S. Pat. No. 6,298,062; and Ser. No. 09/177,415 of Gardell et al. entitled "REAL-TIME VOICEMAIL MONITORING AND CALL CONTROL", now U.S. Pat. No. 6,031,896.

FIELD OF THE INVENTION

The present invention generally relates to the field of telecommunications. More specifically, the invention is directed to a method and apparatus for providing various multi-line appearance capabilities in a communications system provided over a computer network, such as an H.323-based communication system.

BACKGROUND OF THE INVENTION

H.323 is an International Telecommunications Union (ITU) standard that provides guidelines for terminals and equipment that provide multimedia communications services over computer networks such as packet based networks (PBNs). H.323 terminals and equipment may carry real-time audio, video and/or data.

The packet based network over which H.323 terminals communicate may be a point-to-point connection, a single network segment, or an inter-network having multiple segments with complex topologies, such as local area networks (LANs), Intra-Networks, and Inter-Networks, including the Internet.

H.323 terminals may be used in point-to-point, multi-point, or broadcast (as described in the ITU H.332's standard) configurations. They may interwork with other equipment described in standards, such as H.310 terminals on B-ISDN, H.320 terminals on N-ISDN, H.321 terminals on B-ISDN, H.322 terminals on Guaranteed Quality of Service LANs, H.324 terminals on switched telephone and wireless networks, V.70 terminals on telephone networks, and voice terminals on telephone networks or ISDN through the use of gateways. H.323 terminals may be integrated into personal computers or implemented in stand-alone devices such as video telephones.

Computer networks which are capable of transmitting data or information between locations, such as the above-mentioned Internet, have been used to transmit audio information between computers. At the transmitting computer, a person's voice may be digitized using a conventional analog to digital (A/D) converter and transmitted to the receiving location where it is passed through a conventional digital to analog (D/A) converter and presented as audio. This type of audio connectivity is somewhat similar to flat rate telephony, in that audio information may be transmitted from one location to another by way of a high bandwidth, flat rate communications medium. However, this type of computer telephony system suffers from several major disadvantages. First, the system is limited to only those customers who have access to the Internet and who are using compatible end-point software. In addition, while Internet access has now widely proliferated, it has not reached the near universal accessibility of traditional telephone service over public switched telephone networks (PSTN) and the like. Thus, such a computer telephony system is totally useless if a user on the Internet desires to communicate with someone who does not have access to the Internet.

On the other hand, an H.323-based communications system allows a computer network, such as the Internet, to interact with a conventional telephone network, such as a PSTN, general switched telephone network (GSTN), integrated services digital network (ISDN), or other switched circuit network (SCN), all of which are referred to generally herein as switched circuit networks. Such a system provides the appropriate translation between switched circuit network and packet based network data formats and between different communication procedures, in order to allow a user on one system (such as the PSTN) to communicate with a user on an otherwise incompatible system (such as a packet based network).

While the H.323-based communications system is quite effective at supporting communication between two otherwise incompatible networks, current use of that system has been somewhat limited. The system supports communication between two parties and also provides for conferencing of multiple parties in a single call. However, H.323-based systems do not presently address the provision of more traditional multi-line phone behavior offered in PSTN and other more conventional telecommunications networks. This is a significant drawback, especially for those who are already reluctant to convert from conventional telecommunications networks to an H.323-based system for their telecommunications needs.

Accordingly, it will be apparent to those of ordinary skill in the art that there continues to be a need for a communications system that allows for communication between a packet based network and a conventional switched circuit network, while simultaneously providing various multi-line appearance capabilities offered on switched circuit networks. The present invention addresses these needs and others.

SUMMARY OF THE INVENTION

According to the present invention, a novel means are provided for establishing various forms of multi-line appearance capabilities on a computer network. The invention provides several different multi-line appearance variations, including the capability of presenting multiple active lines to a user at a terminal end-point, the presentation of "key system" behavior, and the presentation of "attendant/attendee" behavior, as are offered in conventional switched circuit networks. The present invention is incorporated in a network-based system to support communication with conventional switched circuit networks. The network-based system includes a gateway that provides for communication between two dissimilar networks, a signal routing agent that controls operations and transmits signals, and one or more terminal end-points to receive the above-mentioned multi-line appearances.

Thus, the system of the present invention in one illustrative embodiment includes: a gateway in communication with a switched circuit network, which gateway is operative to translate switched circuit network-compatible signals into computer network-compatible signals. A signal routing agent is in communication with the gateway and with one or more terminal end-points, and is operative to receive plural incoming calls from the gateway addressed to a selected one of the terminals. The signal routing agent is also programmed to simultaneously transmit plural line appearance signals to the selected terminal. The terminal includes a user interface configured to simultaneously display multiple line appearance messages received from the signal routing agent.

In another illustrative embodiment, the system of the present invention comprises: a signal routing agent; a gateway adapted to receive incoming calls, and at least one gatekeeper. The gateway is operative to translate the incoming calls into computer network-compatible signals. The at least one gatekeeper is in communication with the gateway and is responsive to receipt of the incoming call to control the gateway to transmit the computer network-compatible signals to the signal routing agent. The signal routing agent is responsive to receipt of the computer network-compatible signals so as to determine the corresponding terminals assigned to receive the signals and to transmit line appearance messages to the respective terminals.

An illustrative method according to the present invention includes the steps of: receiving plural incoming calls addressed to a particular number; accessing a configuration database to determine the end-point or end-points associated with the dialed number; transmitting plural line appearance signals to each of the associated end-points; and displaying the plural line appearances at each terminal end-point.

BRIEF DESCRIPTION OF THE DRAWINGS

Other objects, features and advantages of the invention discussed in the above summary of the invention will be more clearly understood when taken together with the following detailed description of the embodiments which will be understood as being illustrative only, and the accompanying drawings reflecting aspects of those embodiments, in which.

DETAILED DESCRIPTION OF THE PREFERRED EMBODIMENTS

Figure 1:
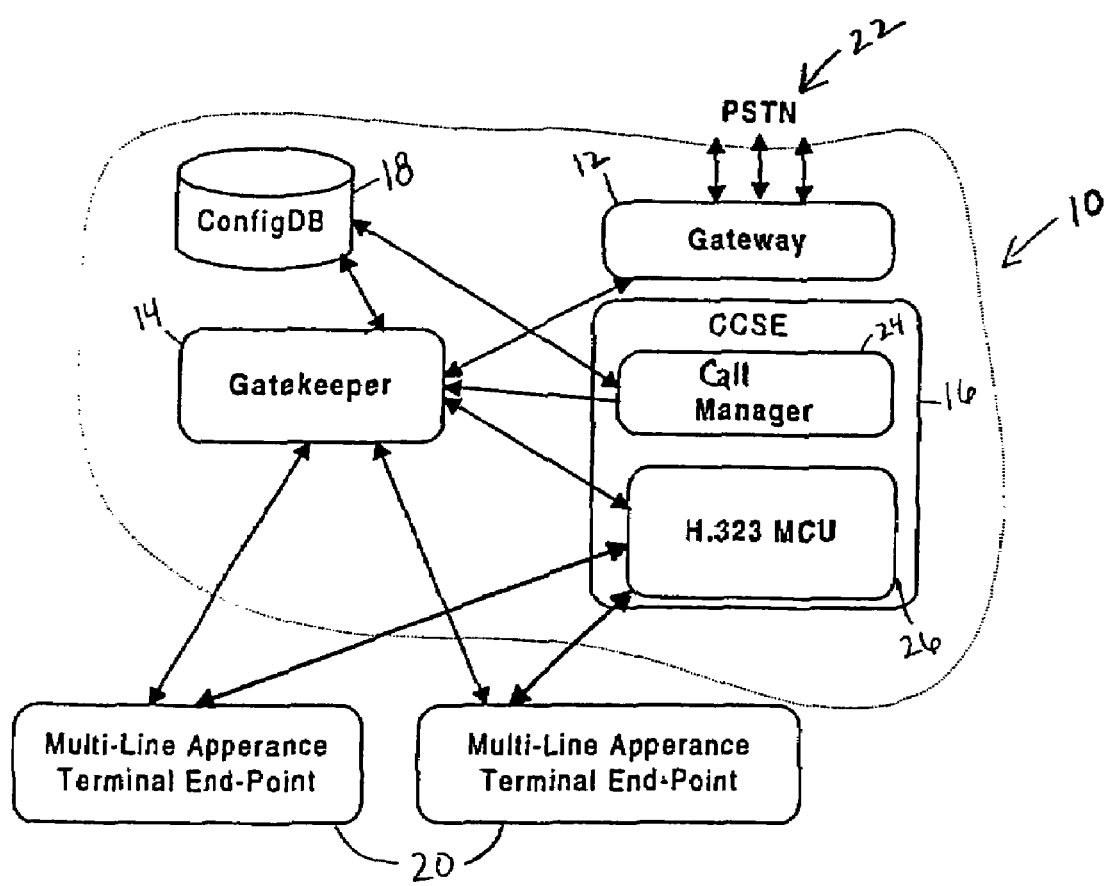
FIG. 1 is a block diagram of an H.323-based communications system comprising one illustrative embodiment of the present invention.

Referring now to the drawings, and particularly to FIG. 1, there is shown an H.323-based network system 10 comprising an illustrative embodiment of the computer network-based communication system of the present invention. Generally, the network system includes a gateway 12, a gatekeeper 14, a signal routing device, for example a call control service entity 16 (CCSE), a configuration database 18, and plural terminal end-points 20. In this embodiment, the network system is operative to receive plural incoming calls from, for example, a public switched telephone network 22 (PSTN) that seek to establish communication with the same terminal end-point, determine the Internet Protocol (IP) address for the corresponding terminal end-point, and transmit plural line appearance messages to that terminal end-point.

The gateway 12 comprises an H.323-defined entity, and provides for signaling conversion between the switched public network, for example the PSTN 22, and the H.323-based network to support communication therebetween. The gateway also allows for interworking with other H-series terminals, GSTN or ISDN voice terminals, or GSTN or ISDN data terminals. The gateway is operative to accept a call originating on, for example, the PSTN, convert the signal to an H.323-compatible format, and pass it into the H.323 network. The gateway may also perform the opposite function, namely take a call originating in H.323, convert the signal to a PSTN-compatible format, and pass it on to the PSTN. The gateway is responsible for passing caller-ID data, number-dialed data, and other such information in both directions. Various telephony signaling technologies may be used by the gateway to perform these functions, as are well known to those of ordinary skill in the art.

The gatekeeper 14 provides admissions control and address translation services. In addition, the gatekeeper may also handle call control services and route call control signals to the H.323 terminal end-points 20. The gatekeeper is in communication with the gateway and receives a translated phone number dialed by a caller on the PSTN from the gateway. The gatekeeper accesses a translation table (not shown) to determine the corresponding Internet Protocol address of the terminal end-point.

The gatekeeper 14 typically includes a server in the form of a computer or router that is dedicated to running the gatekeeper. The computer or router is programmed with software to provide H.323 specified gatekeeper functionality.

The CCSE 16 is a signal routing agent and is responsible for attempting to connect a caller with a particular terminal end-point 20. The CCSE determines the appropriate terminal end-point for receiving the call and routes the signal to the terminal end-point, as is described in greater detail below. In place of the CCSE 16, a call routed gatekeeper could be used to provide the call control services for the network 10. The gatekeeper would then process the call signaling itself and complete the call signaling with the terminal end-point or end-points.

The CCSE 16 includes a call control manager 24 and a multi-point control unit 26 (MCU). The MCU is operative to establish a multi-point conference with three or more terminal end-points and includes a multi-point controller (MC) (not shown) that controls the functions to support such conferences. The MC determines the selected communication mode for the conference and transmits signals to the terminal end-points indicating the operating mode in which those terminals may transmit data.

Figure 6:
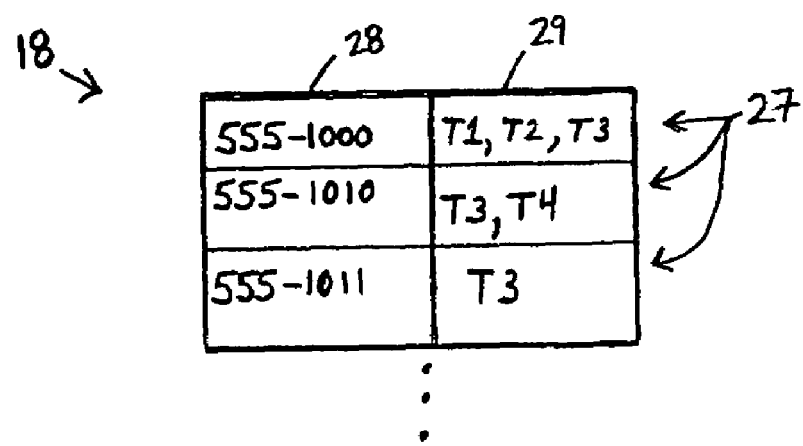
FIG. 6 is a schematic diagram of a configuration database utilized by the present invention.

The configuration database 18 is preferably in the form of an association or look-up table, as is illustratively depicted in FIG. 6. The association table comprises plural address lines 27, each of which provides a segment to link a dialed number, for example an E.164 address 28, and the corresponding IP address 29 for the terminal end-point or end-points. Thus, the association table allows the network system 10 to use the E.164 address data received from the PSTN to determine the corresponding terminal end-point or end-points to be notified, as is described in greater detail below. As shown in FIG. 6 as an example, the telephone number 555-1000 corresponds with a business' primary line and is routed to terminal end-points T1, T2, and T3, which would be the persons responsible for answering the main business line. The telephone number 555-1010 is routed to end-points T3 and T4, which for example could be, respectively, a secretary (attendant) and the secretary's boss (attendee). Furthermore, the telephone number 555-1011 is routed only to end-point T3, and would constitute the secretary's direct line.

The terminal end-points 20 include both input and output equipment for supporting video and audio. Preferably, the terminals include graphical user interfaces (GUIs) for presenting line appearances in various formats, as is described in more detail below.

The special features of the network system 10 of the present invention are implemented, in part, by software programs stored in memory. The software programs are accessible by the components of the system, the function of which is described in greater detail in connection with FIGS. 2, 4, and 5.

Figure 2:
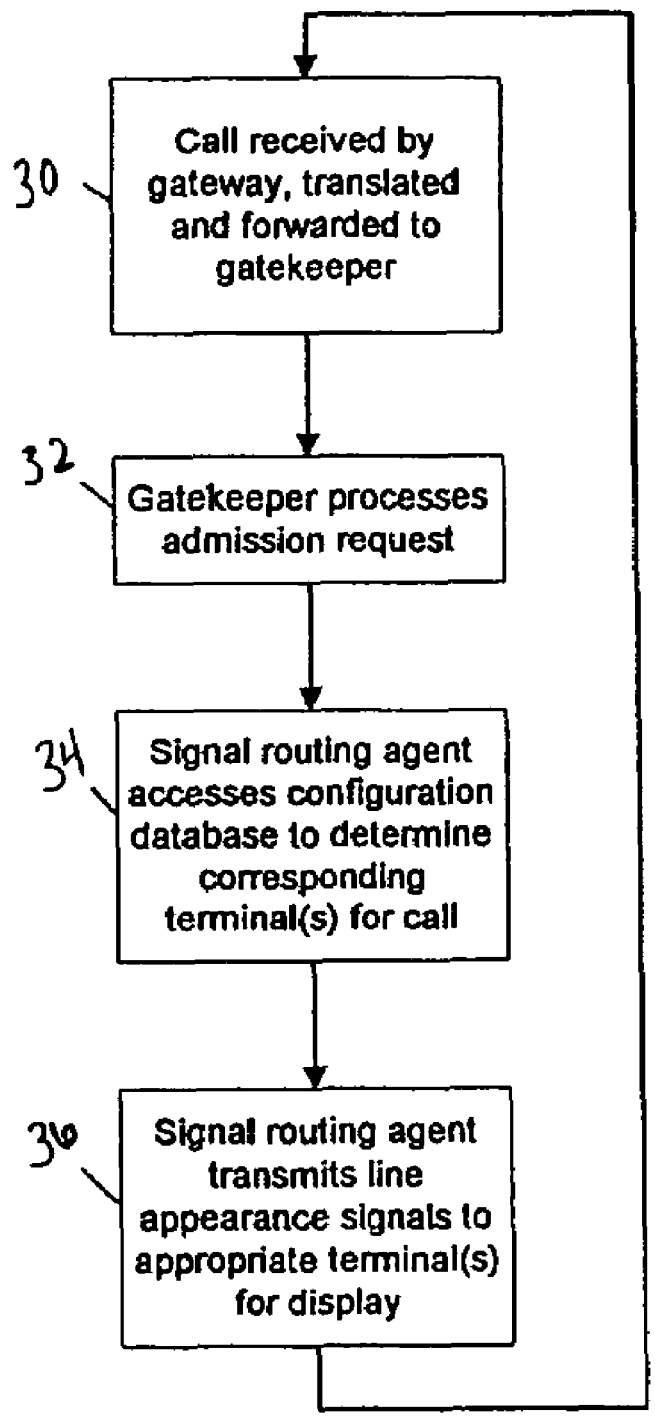
FIG. 2 is a flow chart depicting the operational flow of the system of FIG. 1.

Referring now to FIGS. 1 and 2, one preferred method of the present invention is described. A call placed by a user on the PSTN is transmitted to the gateway 12. At step 30, the gateway performs the necessary translation into the H.323 format. At step 32, the translated signal is transmitted to the gatekeeper 14, which receives the signal and performs the access control function in order to authorize the call from the caller. Possible reasons for rejection may include restricted access to or from particular terminals or gateways and restricted access during certain time periods.

Assuming that the call is authorized, operation proceeds to step 34, where the gatekeeper 14 directs the gateway 12 to establish a signaling path directly to the signal routing device, in this case the CCSE 16. The CCSE receives the logical address for the call, such as a specific E.164 address. The CCSE then accesses the configuration database 18, which is in the form of an association or look-up table (FIG. 6). The CCSE uses the logical address to determine the address of the corresponding terminal end-point and routes the incoming call to that terminal end-point, at step 36. The terminal is programmed to display the incoming call as a line appearance on the GUI. Operation then flows back to step 30, and the process is repeated.

Figure 7:
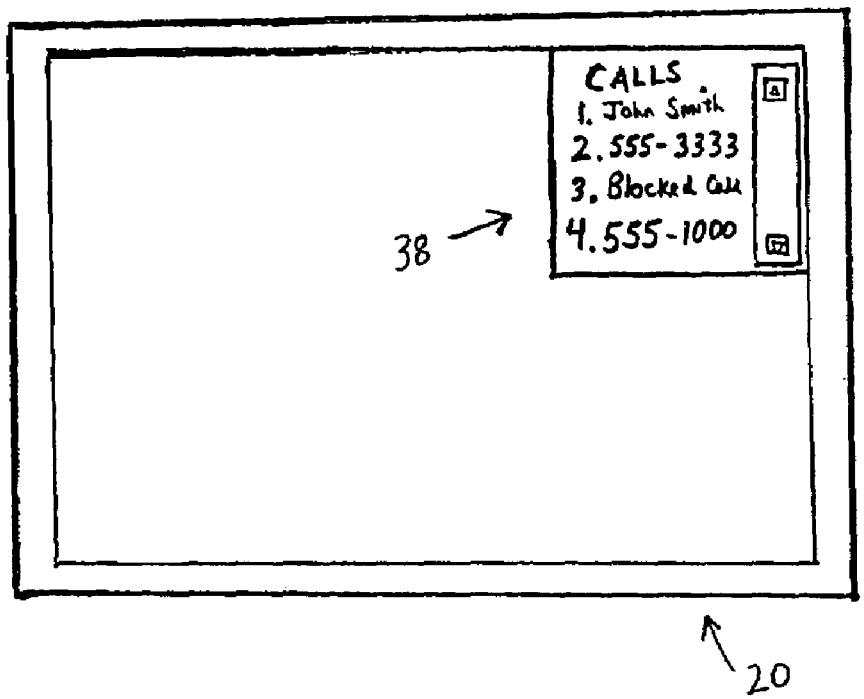
FIG. 7 is a schematic diagram of one embodiment of the layout of a graphical user interface according to the present invention.

If the CCSE 16 receives multiple incoming calls, the CCSE accesses the configuration database 18 for each such call, determines the corresponding terminal end-point 20 for each call, and routes the incoming calls to the respective terminal end-points. If more than one of the incoming calls seeks to connect with a particular terminal end-point, the CCSE routes the appropriate line appearance messages to the terminal end-point, and the terminal displays each line appearance message, for example in a scrollable list 38 or the like, as depicted in FIG. 7 and described further below.

Figure 3:
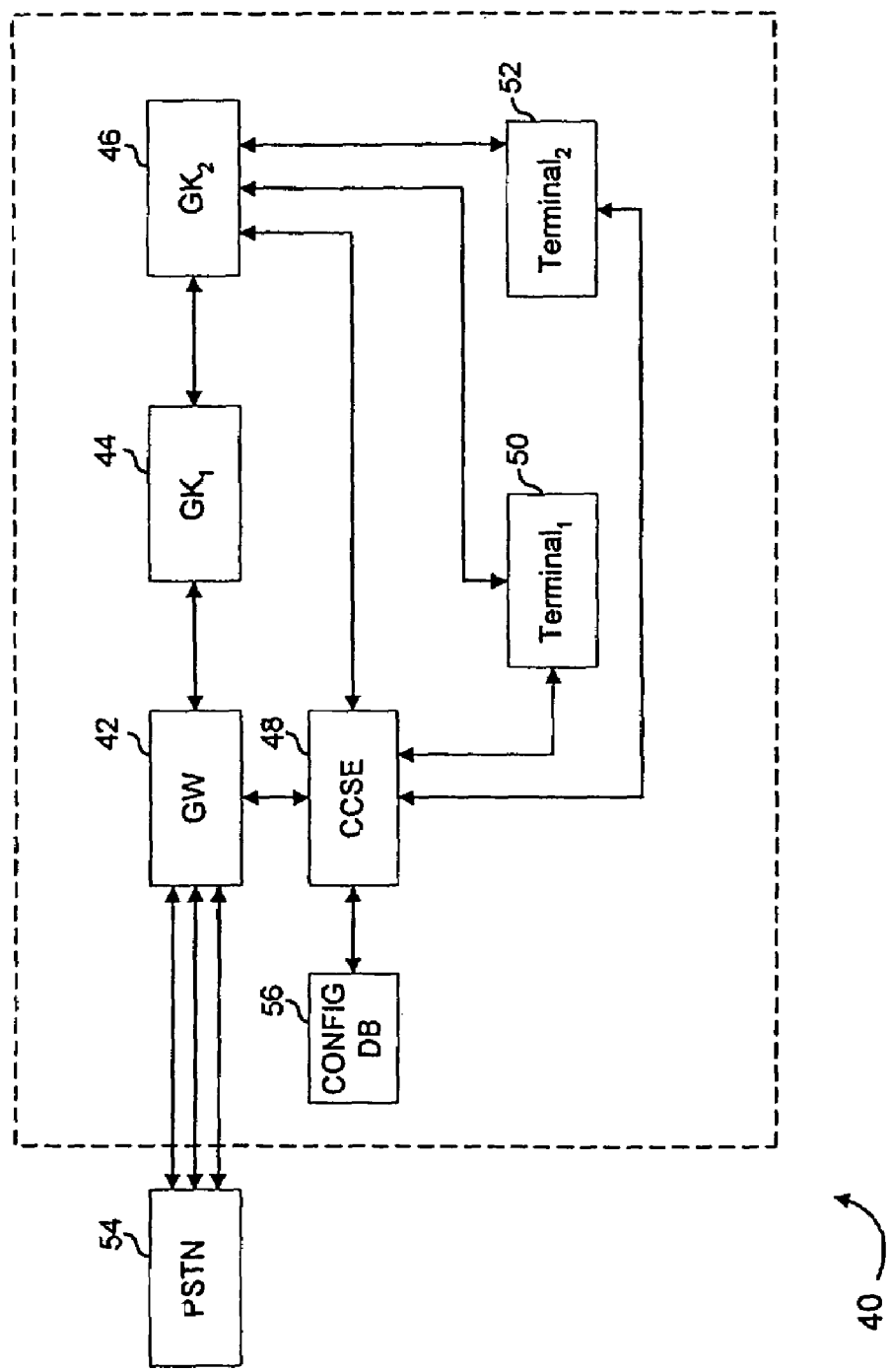
FIG. 3 is a block diagram of an alternative embodiment of the system of the present invention.

Referring now to FIG. 3, there is shown a second embodiment of a network system of the present invention. The network system 40 comprises a gateway 42, a pair of gatekeepers 44 and 46, a CCSE 48, and plural terminal end-points 50 and 52. This system can be used in both the "key system" and "attendant/attendee" configurations to provide more traditional telephone features to a computer network.

A "key system" configuration is one in which a single incoming call is routed to multiple end-points. For example, in relatively small offices or retail establishments, there are often plural telephone devices, and each is set to ring when the office's main phone number is dialed. The call may be answered at one or more of the telephone devices.

An "attendant/attendee" system is somewhat similar to the "key system", in that a single incoming call may be routed to multiple telephone devices. However, in an "attendant/attendee" configuration, one of the telephone devices is actually the target end-point of the caller. The most common example of this configuration is a business person and his or her secretary. A telephone call seeking to connect to the business person's line is often routed to both the business person's telephone device as well as the secretary's telephone device. However, if the secretary's direct number is dialed, the call appears only at the secretary's telephone device.

In FIG. 3, the gateway 42 is in communication with the PSTN 54 for two-way communication therebetween, as described above. Alternatively, instead of being in communication with the PSTN, the gateway could be in communication with another packet based network or with some other switched circuit network.

The first gatekeeper 44 is in communication with the gateway 42 to receive, for example, the translated address from the gateway. The first gatekeeper 44 is operative to multicast a location request to plural gatekeepers (only the affirmatively responding gatekeeper 46 is shown in FIG. 3) to locate the gatekeeper that services a particular dialed number, as is described in greater detail below.

The CCSE 48 is in communication with the gateway 42 and with the affirmatively responding gatekeeper 46. The CCSE serves as the signal routing agent for the call signals and communicates directly with the gateway 42. As with the previous embodiment, a call routing gatekeeper can be used in the place of the CCSE.

Figure 4:
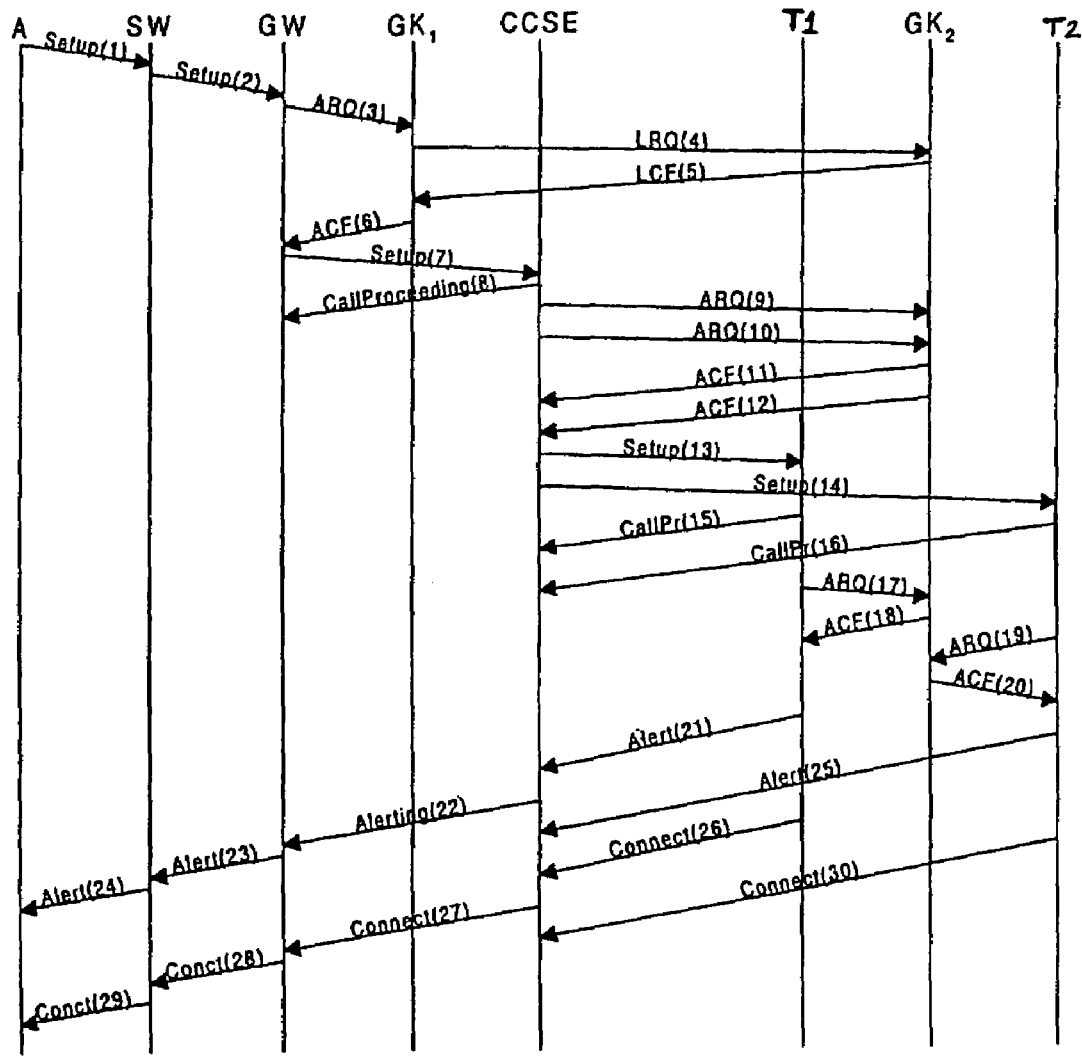
FIG. 4 is a timing diagram for the signaling sequence of the system of FIG. 3.
Figure 5:
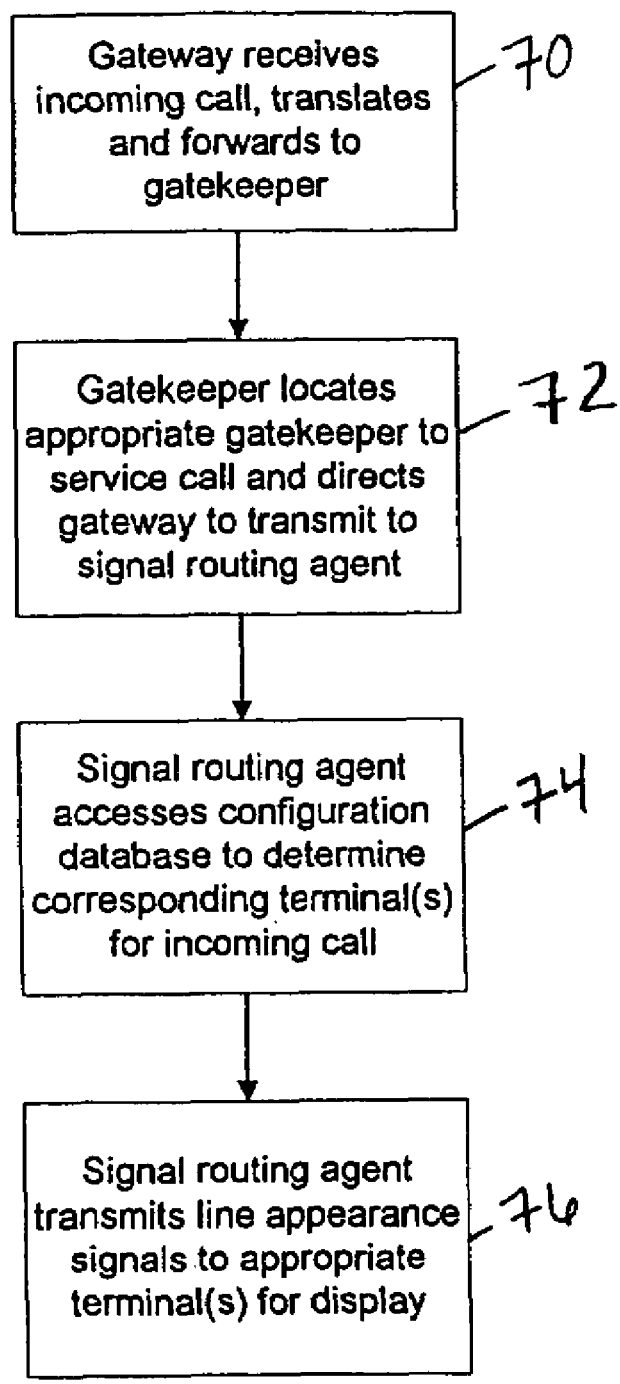
FIG. 5 is a flow chart depicting the operational flow of the system of FIG. 3.

Referring to FIG. 4, there is shown a timing diagram for the signaling involved in the "key system" mode of the present invention, and FIG. 5 shows the corresponding flow chart, whereby a single incoming call appears virtually simultaneously on two or more terminal end-points. An incoming call from telephone device A is transmitted as a Setup (1) signal through the PSTN switching network SW and to the gateway (GW) 42 as a Setup (2) signal. The gateway then transmits an admission request (ARQ) signal ARQ (3) to the first gatekeeper 44 ($GK_1$), corresponding to step 70 in FIG. 5. The first gatekeeper $GK_1$ is then operative to multicast a location request (LRQ) signal LRQ (4) to locate the gatekeeper $GK_2$ that services the number dialed at the telephone device A. The second gatekeeper 46 ($GK_2$), which services the number dialed, then transmits a location confirmation (LCF) signal LCF (5) to the first gatekeeper $GK_1$, which transmits an admission confirmation (ACF) signal ACF (6) to the gateway GW with the address of the corresponding CCSE 48 that services the number dialed. The ACF (6) signal also serves to direct the gateway GW to establish a direct signaling path to the CCSE, corresponding to step 72 in FIG. 5.

The gateway 42 (GW) then transmits a Setup (7) signal to the CCSE 48, which responds with a call proceeding signal CallPr (8) transmitted back to the gateway. The CCSE then accesses the configuration database 56 to determine the corresponding terminal end-point or end-points that are to receive line appearances for the particular incoming call, corresponding to step 74 in FIG. 5. As described above, the configuration database includes an association table, a look-up table, or the like, including a column of switched circuit network addresses and corresponding packet based network addresses. In this example, the CCSE accesses the configuration database and determines that two terminal end-points are to receive the incoming call, namely end-points T1 and T2. The CCSE then transmits a pair of ARQ signals ARQ (9) and ARQ (10) to the second gatekeeper 46, one for each terminal end-point. The second gatekeeper 46 then transmits a pair of ACF signals ACF (11) and ACF (12) back to the CCSE 48 authorizing the CCSE to communicate directly with the two terminals 50 and 52, which are the end-points T1 and T2. The CCSE then transmits, at approximately the same time, respective setup signals Setup (13) and Setup (14) to T1 and T2, which appear in the form of line appearances at the graphical user interfaces of each end-point, corresponding to step 76 in FIG. 5. In this manner, a key system is achieved whereby a single incoming call is presented at multiple end-points, as established by the CCSE and configuration database.

As described above, the CCSE 48 can be replaced with a call routed gatekeeper that is programmed to access the configuration database 56 and determine to which terminal end-point or end-points a particular incoming call is to be routed.

As shown in FIG. 4, assuming the user at each end-point T1 and T2 desires to accept the call, each end-point transmits an ARQ signal, ARQ (17) and ARQ (19), to the second gatekeeper 46 ($GK_2$). The gatekeeper $GK_2$ responds with respective ACF signals ACF (18) and ACF (20), which include the call signaling channel transport address of the CCSE 48. The end-points T1 and T2 then transmit respective alert signals Alert (21) and Alert (25) directly to the CCSE indicating that each end-point is accepting the call. Respective alert signals Alert (22), Alert (23), and Alert (24) are transmitted through the gateway 42 (GW) and PSTN switching network SW to the caller's telephone device A. The end-points T1 and T2 then transmit connect signals Connect (26) and Connect (30) to the CCSE, which then transmits a connect signal Connect (27) to the gateway GW, which routes Connect (28) signal to the PSTN switching network SW, which in turn transmits a Connect (29) signal to the caller's telephone device A, thereby establishing a communication channel between the caller's telephone device and the two end-points T1 and T2, via the signal routing agent CCSE 48.

It will be apparent that the number of terminal end-points may be more or less than two for a particular incoming call. It will also be apparent that depending on the telephone number dialed, different sets of end-points will receive a corresponding line appearance. For example, an incoming call to a main company number may be routed to every terminal end-point in the company (such as the number 555-1000 in FIG. 6), whereas an incoming call to the company's customer service number is only routed to the terminal end-points manned by the company's customer service representatives. Such information is conveniently and efficiently maintained in the configuration database 56 (FIG. 6).

In the case of an "attendant/attendee" system, the procedure employed by the system 40 is similar to the "key system" configuration and may even be identical. A call to a particular telephone number is routed through the gateway 42 (GW) and first gatekeeper 44 ($GK_1$), which locates the second gatekeeper 46 ($GK_2$) that services the particular number. The first gatekeeper $GK_1$ then directs the gateway GW to communicate directly with the CCSE 48. The CCSE accesses the configuration database 56 to determine the terminal end-point or end-points which are to receive line appearances corresponding to that incoming call. Where the dialed phone number is an "attendee's" phone line, then the procedure is essentially identical to a two-terminal key system configuration, as described above, and the incoming call is virtually simultaneously routed to the attendee and the associated attendant, as determined by accessing the configuration database. However, if the dialed phone number is to an attendant's direct line, then the incoming call is only routed to the attendant's terminal end-point.

It is well known to those of ordinary skill in the art that many central offices provide, along with the incoming call setup signal, Caller Identification ("Caller ID") information. Thus, as shown in FIG. 7, the scrollable list 38 of line appearances on the terminal end-point 20 can display the caller's phone number (such as entries 2 and 4), the caller's name in instances where the party being called has previously entered the association between the phone number and caller's name (such as entry 1), and the like. In addition, where a caller has Caller ID blocking, the line appearance simply says "Blocked Call" or the like. Thus, rather than simply displaying plural line appearances without any identification of the caller, the display, e.g. a graphical user interface at a terminal, can display names, numbers, and the like, typically in the order the calls were received, to allow the party being called to make an informed selection of the incoming call that he or she wishes to accept.

The system 10 of the present invention in one illustrative embodiment may be incorporated in a hierarchical communications network, as is disclosed in co-pending U.S. Provisional Patent Application Ser. No. 60/105,326 of Gardell et al. entitled "A HIGH SPEED COMMUNICATIONS SYSTEM OPERATING OVER A COMPUTER NETWORK", and filed on Oct. 23, 1998, the disclosure of which is incorporated herein by reference. Thus, the various multi-line appearance capabilities disclosed herein may be implemented in a nation-wide or even worldwide hierarchical computer network.

From the foregoing, it will be apparent that the network system 10 of the present invention modifies existing computer network-based communications systems, such as H.323-based systems, to provide more traditional multi-line appearance capabilities. In particular, the ability to provide key system and attendant/attendee modes is achieved by the present invention.

While the invention has been particularly shown and described with reference to preferred embodiments thereof, it will be understood by those skilled in the art that various changes in form and details may be made therein without departing from the spirit and scope of the invention.

We claim:

1. A system comprising:
a signal routing agent;
a gateway adapted to receive a first incoming call addressed to a first dialed number and a second incoming call addressed to a second dialed number;
at least one gatekeeper in communication with the gateway and responsive to receipt of the first incoming call to control the gateway to transmit a first computer network-compatible signal corresponding to the first incoming call to the signal routing agent and responsive to receipt of the second incoming call to control the gateway to transmit a second computer network-compatible signal corresponding to the second incoming call to the signal routing agent;
a data store storing data associating the first incoming call to a set of terminals selected from a plurality of terminals and associating the second incoming call to at least one of the terminals of the selected set; and
the signal routing agent being responsive to receipt of the first computer network-compatible signal to access the data store to identify the selected set of terminals assigned to receive the first computer network-compatible signal and to transmit first line appearance messages that identify an origin of the first incoming call to the selected set of terminals, and being responsive to receipt of the second computer network-compatible signal to access the data store to identify the at least one of the terminals of the selected set assigned to receive the second computer network-compatible signal and to transmit a second line appearance message identifying an origin of the second incoming call to the at least one of the terminals of the selected set.

2. The system of claim 1, wherein the data store comprises a configuration database.

3. The system of claim 1, further comprising:
a second gatekeeper, said at least one gatekeeper being in communication with the gateway and the second gatekeeper being in communication with said at least one gatekeeper, the signal routing agent and the plurality of terminals.

4. The system of claim 1, wherein the signal routing agent comprises a call control service entity.

5. The system of claim 1, wherein the signal routing agent comprises a call routed gatekeeper.

6. The system of claim 4, wherein the call control service entity comprises a multi-point control unit and a call manager.

7. The system of claim 4, wherein the gateway is configured to translate the first and second incoming calls into the first and second computer network-compatible signals.

8. A method comprising:
receiving a first incoming call addressed to a dialed number and a second incoming call addressed to a second dialed number;
translating the first and second incoming calls into packet switched network compatible signals;
accessing a data store to identify a plurality of terminals corresponding to the first dialed number and to identify one of the plurality of terminals corresponding to the second dialed number;
transmitting first line appearance signals that identify an origin of the first incoming call to each of the plurality of terminals over a packet switched network, wherein the first line appearance signals are transmitted approximately simultaneously; and
transmitting a second line appearance signal identifying an origin of the second incoming call to the one of the plurality of terminals over the packet switched network.

9. The method of claim 8, wherein the packet switched network compatible signal is an H.323-compliant signal.

10. A method comprising:
receiving a first incoming call request, the first incoming call request including a first destination address and first origination information corresponding to an origin of the first incoming call request;
receiving a second incoming call request, the second incoming call request including a second destination address and second origination information corresponding to an origin of the second incoming call request;
accessing a data store to identify a plurality of terminals connected to a packet switched network and corresponding to the first destination address and to identify a selected terminal of the plurality of terminals corresponding to the second destination address;
transmitting to each of the plurality of terminals at least one call setup message over the packet switched network that includes a first origination identifier based on the origin information of the first incoming call request wherein the call setup messages are transmitted to each of the plurality of terminals approximately simultaneously; and
transmitting to the selected terminal at least one call setup message over the packet switched network that includes a second origination identifier based on the origin information of the second incoming call request.

11. A system comprising:
a signal routing agent;
a gateway adapted to receive a request for a first incoming call addressed to a first dialed number and a second incoming call addressed to a second dialed number;
a first server in communication with the gateway and responsive to receipt of the request for the first incoming call to control the gateway to transmit a first packet switched network-compatible signal corresponding to the request for the first incoming call to the signal routing agent and being responsive to receipt of the request for the second incoming call to control the gateway to transmit a second packet switched network-compatible signal corresponding to the request for the second incoming call to the signal routing agent;
a data store storing data associating the first incoming call to a set of terminals selected from a plurality of terminals connected to a packet switched network and associating the second incoming call to at least one of the terminals of the selected set; and
the signal routing agent being responsive to receipt of the first packet switched network-compatible signal to access the data store to identify the selected set of the plurality of terminals assigned to receive the first packet switched network-compatible signals and to transmit call setup messages that identify an origin of the first incoming call to each of the plurality of terminals, the signal routing agent also being responsive to receipt of the second packet switched network-compatible signals to access the data store to identify the at least one of the terminal of the selected set assigned to receive the second packet switched network-compatible signal and to transmit call setup messages that identify an origin of the second incoming call to the at least one of the terminals of the selected set.

12. The system of claim 11, wherein the data store comprises a configuration database.

13. The system of claim 11, further comprising:
a second server, wherein said first server is in communication with the gateway and the second server is in communication with said first server, the signal routing agent and the plurality of terminals.

14. The system of claim 11, wherein the signal routing agent comprises a call control service entity.

15. The system of claim 11, wherein the signal routing agent comprises a call routed gatekeeper.

16. The system of claim 11, wherein the signal routing agent comprises a call control service entity, the call control service entity comprising a multi-point control unit and a call manager.

* * * * *